US008478487B2

(12) United States Patent
Kojo et al.

(10) Patent No.: US 8,478,487 B2
(45) Date of Patent: Jul. 2, 2013

(54) CONTROL DEVICE FOR VEHICLES TO MAKE RAPID COUNTER-MEASURE AGAINST COMMUNICATION ABNORMALITY IN COMMUNICATION MEANS BETWEEN CALCULATION CONTROL DEVICES

(75) Inventors: Takahiro Kojo, Gotenba (JP); Yoshiaki Tsuchiya, Nishikamo-gun (JP); Masato Suzumura, Susono (JP); Jun Sakugawa, Gotenba (JP); Kenji Asano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1135 days.

(21) Appl. No.: 11/664,936

(22) PCT Filed: Oct. 18, 2005

(86) PCT No.: PCT/JP2005/019459
§ 371 (c)(1),
(2), (4) Date: Apr. 9, 2007

(87) PCT Pub. No.: WO2006/043693
PCT Pub. Date: Apr. 27, 2006

(65) Prior Publication Data
US 2008/0195275 A1    Aug. 14, 2008

(30) Foreign Application Priority Data

Oct. 18, 2004   (JP) .................................. 2004-303027

(51) Int. Cl.
*B62D 5/00*   (2006.01)
(52) U.S. Cl.
USPC ................. 701/43; 318/564; 318/565; 700/3; 700/21

(58) Field of Classification Search
USPC ......... 701/36, 41, 43; 180/446, 410; 318/563, 318/564, 565; 700/2, 3, 4, 5, 19, 20, 21
See application file for complete search history.

(56) References Cited

U.S. PATENT DOCUMENTS 4,621,327 A * 11/1986 Dolph et al. ..................... 701/43
4,869,334 A *  9/1989 Marumoto et al. ........... 180/446
(Continued)

FOREIGN PATENT DOCUMENTS
FR         2 843 341 A1    2/2004
JP         A 3-286340     12/1991
(Continued)

OTHER PUBLICATIONS
JP 3286340A Translation.*

*Primary Examiner* — Thomas Black
*Assistant Examiner* — Ce Li
(74) *Attorney, Agent, or Firm* — Oliff & Berridge, PLC (57) ABSTRACT

In the control device for vehicles which executes a control of the vehicle by one calculation control device based upon a target control amount generated by another calculation control device connected to the one calculation control device by way of a communication means, the other calculation control device calculates an estimated target control amount by itself to compare it with the target control amount generated by the one calculation control device and input thereto by way of the communication means, or a third calculation control device compares the target control amounts generated by the one and the other calculation control devices and input thereto by way of the communication means, thereby to judge if an abnormality has occurred in the communication means, and to rapidly modify the control to make a counter-measure against the abnormality.

10 Claims, 5 Drawing Sheets

U.S. PATENT DOCUMENTS

| | | | | |
|---|---|---|---|---|
| 5,202,830 | A * | 4/1993 | Tsurumiya et al. | 701/41 |
| 5,259,473 | A * | 11/1993 | Nishimoto | 180/446 |
| 5,271,474 | A * | 12/1993 | Nishimoto et al. | 180/446 |
| 5,360,077 | A * | 11/1994 | Nishimoto et al. | 180/446 |
| 5,504,679 | A * | 4/1996 | Wada et al. | 701/41 |
| 5,765,661 | A * | 6/1998 | Matsuoka | 180/446 |
| 5,809,444 | A * | 9/1998 | Hadeler et al. | 701/72 |
| 5,966,305 | A * | 10/1999 | Watari et al. | 700/82 |
| 5,980,081 | A * | 11/1999 | Watari et al. | 700/79 |
| 6,032,091 | A * | 2/2000 | Noro et al. | 701/42 |
| 6,373,217 | B1 * | 4/2002 | Kawada et al. | 318/564 |
| 6,678,586 | B2 * | 1/2004 | Nakamoto et al. | 701/1 |
| 6,704,632 | B2 * | 3/2004 | Itoh | 701/43 |
| 6,760,653 | B2 * | 7/2004 | Miller | 701/43 |
| 6,892,129 | B2 * | 5/2005 | Miyano | 701/107 |
| 6,988,027 | B2 * | 1/2006 | Yuda et al. | 701/41 |
| 7,002,313 | B2 * | 2/2006 | Kawada | 318/564 |
| 7,107,488 | B2 * | 9/2006 | Hashimoto et al. | 714/25 |

FOREIGN PATENT DOCUMENTS

| | | |
|---|---|---|
| JP | A 6-298105 | 10/1994 |
| JP | A 6-305439 | 11/1994 |
| JP | A 2004-189163 | 7/2004 |

* cited by examiner

CONTROL DEVICE FOR VEHICLES TO MAKE RAPID COUNTER-MEASURE AGAINST COMMUNICATION ABNORMALITY IN COMMUNICATION MEANS BETWEEN CALCULATION CONTROL DEVICES

FIELD OF THE INVENTION

The present invention relates to a control device for vehicles comprising two calculation control devices connected by a communication means and adapted to control the operation of the vehicle by one of the calculation control devices based upon a target control amount calculated by the other of the calculation control devices according to the vehicle state amount and input thereto by way of the communication means.

BACKGROUND OF THE INVENTION

When a signal is transmitted between two calculation control devices, a communication error can occur due to a sticking or the like of RAM of a communication buffer, in addition to a calculation error in the calculation control devices. With regard to such a problem, it is described in Japanese Patent Laid-open Publication Hei 6-298105 to construct the operation control device for vehicles such that two calculation control devices not only watch the results of calculation of each other but also watch an occurrence of an abnormality in the communication means therebetween by providing main and sub CPU therein and comparing the output of CPU of each other.

DISCLOSURE OF THE INVENTION

As a basic method of watching if a signal is correctly transmitted by a communication means, it is thought of to return the signal received by one calculation control device from another calculation control device to the other calculation control device just as received, and to judge in the other calculation control device if the contents of the signal returned from the one calculation control device are the same as those of the dispatched signal. In this case, since the signal must be reciprocated between the two calculation control devices, it is unavoidable that a delay occurs in the detection of a communication abnormality. Moreover, when an instruction signal for stopping the control is transmitted from the other calculation control device to the one calculation control device, a further delay time lapses from the time point when the one calculation control device receives the stop instruction signal until the control is stopped.

It is the principal object of the present invention to make a rapid counter-measure against an occurrence of an abnormality when it occurred in a control device for vehicles comprising two calculation control devices connected by a communication means and adapted to control the operation of the vehicle by one of the calculation control devices based upon a target control amount calculated by the other of the calculation control devices, upon a rapid judgment of the abnormality in the communication or the target control amount.

In order to accomplish the abovementioned principal object, the present invention proposes a control device for vehicles comprising first and second calculation control devices and a communication means connecting therebetween, the first calculation control device calculating a first target control amount for a vehicle operation control according to a vehicle state amount, the second calculation control device executing an operation control of the vehicle based upon the first target control amount input from the first calculation control device by a way of the communication means, wherein the second calculation control device calculates a second target control amount for the vehicle operation control, the first and second target control amounts are compared with one another, and the vehicle operation control is modified in a manner thereof according to an abnormality judgment based upon the comparison.

According to the vehicle control device of the abovementioned construction, when an abnormality was detected as occurred in either the communication means, the calculation of the first target control amount by the first calculation control device or the calculation of the second target control amount by the second calculation control device, the control can be immediately modified to make a counter-measure against the abnormality in the second calculation control device executing the vehicle operation control.

The abovementioned control device for vehicles may further comprise a third calculation control device connected with the first and second calculation control devices by way of the communications means, wherein the third calculation control device compares the first and second target control amounts input respectively from the first and second calculation control devices by way of the communication means, and the abnormality judgment is made by the third calculation control device based upon the comparison. By such an arrangement, since the comparison between the first and second target control amounts is made by the third calculation control device, the second calculation control device is exempt from the operation of comparing the first target control amount input from the first calculation control device by way of the communication means and the second target control amount generated by itself, whereby the control operation of the second calculation control device is simplified, and the second calculation control device can more appropriately execute the vehicle operation control.

Further, in order to accomplish the abovementioned principal object, the present invention proposes a control device for vehicles comprising first, second and third calculation control devices and a communication means connecting thereamong, the first calculation control device calculating a target control amount for a vehicle operation control according to a vehicle state amount, the second calculation control device executing an operation control of the vehicle based upon the target control amount input from the first calculation control device by a way of the communication means, wherein the third calculation control device compares the target control amount input from the first calculation control device by way of the communication means and the target control amount input from the second calculation control device by way of the communication means, and the vehicle operation control is modified in a manner thereof according to an abnormality judgment based upon the comparison.

According to the control device for vehicles of the abovementioned construction, when an abnormality has occurred in the most important part of the communication means for transmitting the target control amount from the first calculation control device to the second calculation control device, it is detected in the third calculation control device by comparing the target control amounts input thereto from the first and second calculation control devices by way of the communication means, so that a modification of the control to make a counter-measure to the abnormality is immediately done in the second calculation control device executing the vehicle operation control, and a rapid counter-measure is available against the occurrence of an abnormality. In this case, the calculation of the target control amount may be made only in the first calculation control device.

In either of the abovementioned cases, the modification of the vehicle operation control in the manner thereof according to the abnormality judgment may be such that the second calculation control device executes the vehicle operation control based upon a modified target control amount decreased from the original target control amount. By such an arrangement, when there is an abnormality in the communication means or the target control amount, the degree of control is lessened to obtain some proper effects of the control operation than completely stopping the control operation.

The target control amount may be an adjusting amount of steering angle of steered wheels relative to a steering angle of a steering wheel, and the modified target control amount may be gradually decreased according to the lapse of time. By such an arrangement, when an abnormality has occurred in the generation or transmission of the target control amount, the control amount is returned to zero so that the steering angle of the steered wheels correctly corresponds to the steering angle of the steering wheel.

A standard for the abnormality judgment based upon the comparison may be made more strict when vehicle speed is high than when vehicle speed is low. By such an amendment, it is met that the influence of abnormality is larger when the vehicle speed is high than when the vehicle speed is low.

The abnormality judgment based upon the comparison of the first and second target control amounts may be made in two stages such that, when a larger degree of abnormality was judged, the control is ended by gradually decreasing the first target control amount, whereas, when a smaller degree of abnormality was judged, the control is continued based upon a modified target control amount to restrict the first target control amount not to be different from the second target control amount beyond a determined difference. By such an arrangement, some appropriate counter-measure is made against a semi-abnormality judgment not so serious as to stop the control.

BRIEF DESCRIPTION OF THE DRAWINGS

In the accompanying drawings.

BEST MODE EMBODIMENTS OF THE INVENTION

In the following the present invention will be described in the form of some preferred embodiments thereof by referring to the accompanying drawings.

Figure 1:
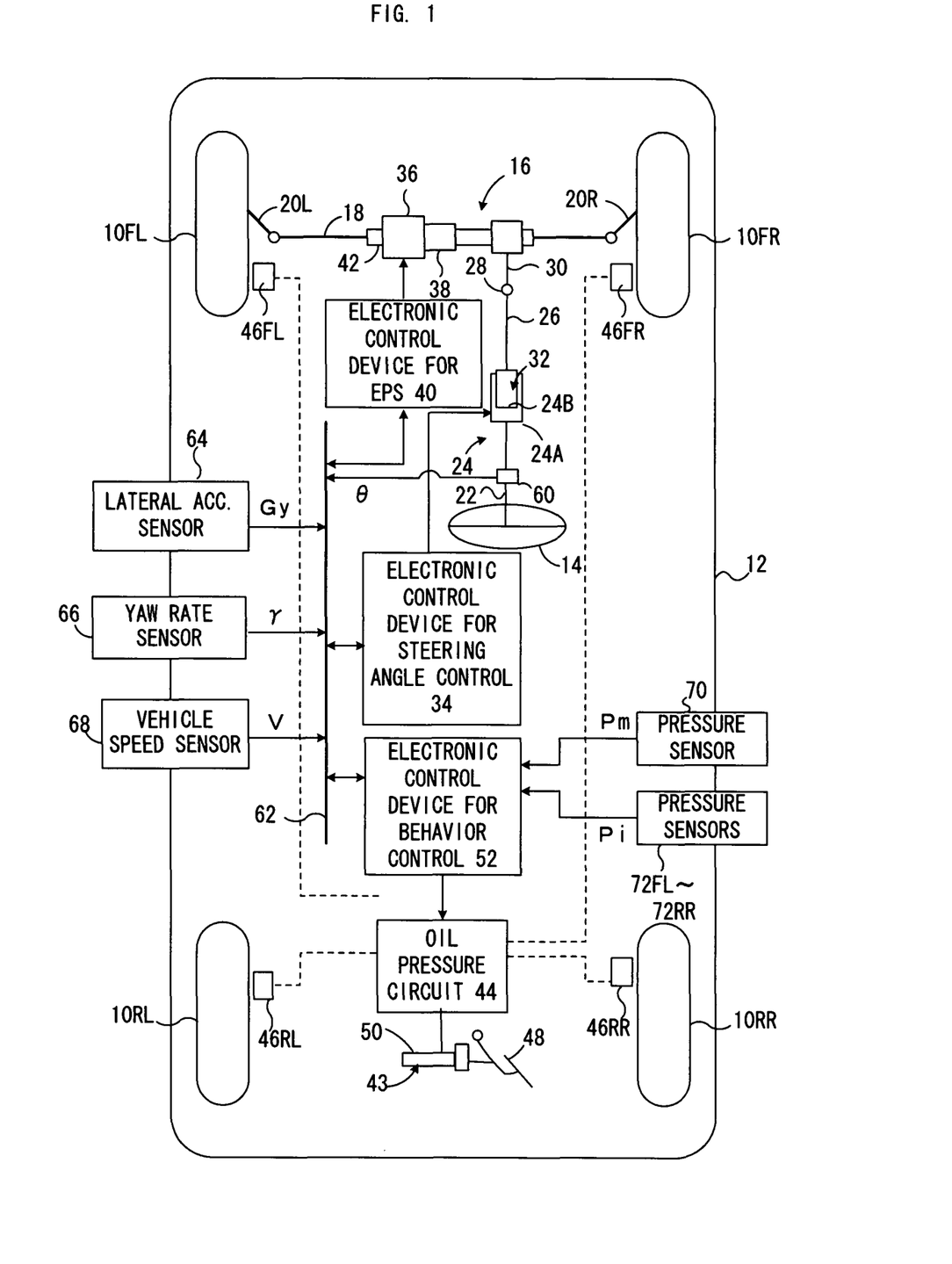
FIG. 1 is a diagrammatical illustration of a vehicle showing the constructional components concerned with the control device according to the present invention.
Figure 2:
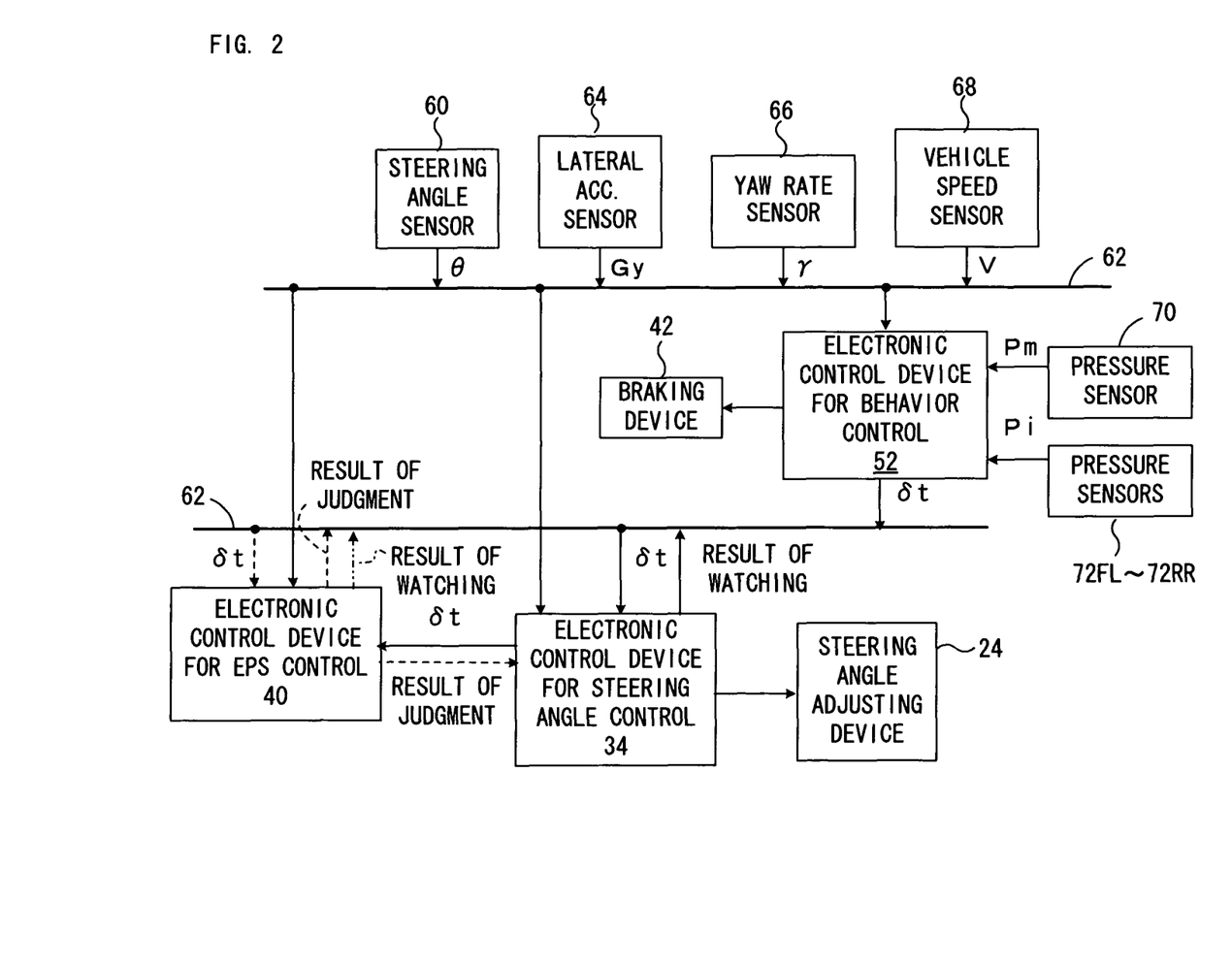
FIG. 2 is a block diagram of the control system in the control device.

FIG. 1 is a diagrammatical view showing an embodiment of the control device for vehicles according to the present invention constructed as a behavior control device for controlling the behavior of the vehicle by controlling the braking forces of the respective wheels and the steering angles of the front left and right wheels, and FIG. 2 is a block diagram showing the control system thereof.

In FIG. 1, 10FL and 10FR are front left and right wheels, respectively, which are steered, and 10RL and 10RR are rear left and right wheels, respectively, which are adapted to be driven by a power source not shown in the figure. These wheels are suspended to the vehicle body 12 by the wheel suspension devices not shown in the figure. The front left wheel 10FL and the front right wheel 10FR are steered by a rack-and-pinion type power steering device 16 in accordance with the steering operation of the steering wheel 14 by the driver by way of a rack bar 18 and tie rods 20L and 20R.

The steering wheel 14 is connected with a pinion shaft 30 of the power steering device 16 by way of an upper steering shaft 22, a steering angle adjusting device 24, a lower steering shaft 26 and a universal joint 28. The steering angle adjusting device 24 is connected with the lower end of the upper steering shaft 22 at the side of the housing 24A and includes an electric motor 32 for modifying steering connected to the upper end of the lower steering shaft 26 at the side of the rotor 24B. The steering angle adjusting device 24 variably adjusts the ratio of the steering angle of the steered front left and right wheels 10FL and 10FR relative to the rotational angle of the steering wheel 14 by rotating the lower steering shaft 26 relative to the upper steering shaft 22, i.e. the steering gear ratio, and also steers the steered front left and right wheels 10FL and 10FR relative to the steering wheel 14 for the purpose of behavior control.

The steering angle adjusting device 24 is controlled by an electronic control device 34 including a microcomputer.

In this connection, when such a trouble has occurred in the steering angle adjusting device 24 that the lower steering shaft 26 can not be rotated relative to the upper steering shaft 22, a locking means not shown in the figure operates to mechanically prevent the relative rotation between the housing 24A and the rotor 24B so that the upper steering shaft 22 and the lower steering shaft 26 are bound together not to rotate relative to one another.

The power steering device 16 is a rack co-axial type electric power steering device (EPS) having an electric motor 36, and a ball-screw type motion conversion mechanism 38 for converting the rotation of the motor 36 to a correspondingly reciprocating movement of the rack bar 18. The electric power steering device 16 is controlled by an electronic control device 40 for controlling the electric power steering device, so as to function as a steering assist force generating device to lessen the steering load of the driver by generating a steering assist force to drive the rack bar 18 relative to the housing 42. In this connection, the construction of the steering assist force generating device itself is known in this art.

The braking forces of the respective wheels are controlled by the pressures Pi (i=fl, fr, rl and rr) in the wheel cylinders 46FL, 46FR, 46RL and 46RR, as controlled by an oil pressure circuit 44. Although not shown in the figure, the oil pressure circuit 44 includes an oil reservoir, an oil pump, various valves and others, and the braking pressures of the respective wheel cylinders are normally controlled according to the depressing operation of the brake pedal 48 by the driver and also individually controlled by an electronic control device 52 for the behavior control as described in detail hereinbelow.

In the shown embodiment, a steering angle sensor 60 is provided at the upper steering shaft 22 for detecting the rotational angle thereof as a steering angle θ, and the signal indicating the steering angle θ is supplied to the electronic control device 34 for the steering control and the electronic control device 52 for the behavior control.

The electronic control device 34 for the steering control and the electronic control device 52 for the behavior control are supplied with a signal indicating lateral acceleration Gy of the vehicle detected by a lateral acceleration sensor 64, a signal indicating yaw rate γ detected by a yaw rate sensor 66, and a signal indicating vehicle speed V detected by a vehicle speed sensor 68 by way of a vehicle information infrastructure 62, and further the electronic control device 52 for the behavior control is supplied with a signal indicating the master cylinder pressure Pm detected by a pressure sensor 70 and signals indicating braking pressures Pi of the respective wheels detected by pressure sensors 72FL-72RR.

The electronic control device 34 for the steering control, the electronic control device 40 for the EPS control and the electronic control device 52 for the behavior control may respectively have microcomputers each including CPU, ROM, RAM and input/output port means interconnected by a common bus. The steering angle sensor 60, the lateral acceleration sensor 64 and the yaw rate sensor 66 detect the steering angle θ, the lateral acceleration Gy and the yaw rate γ as positive values when the vehicle is steered or turning leftward and as negative values when the vehicle is steered or turning rightward.

The electronic control device 52 for the behavior control calculates, as a first calculation control device, a spin state amount SS showing a spinning tendency of the vehicle and a driftout state amount DS showing a drifting out tendency of the vehicle based upon the vehicle state amounts which change according to the running of the vehicle like the steering angle θ and the lateral acceleration Gy, and calculates a target yaw moment Mt and a target deceleration Gxbt of the vehicle for stabilizing the behavior of the vehicle.

Moreover, the electronic control device 52 for the behavior control shares the target yaw moment Mt into a target yaw moment Mts by the steering angle control and a target yaw moment Mtb by the braking force control of the respective wheels, calculates a target steering angle δt for the front left and right wheels (target value of the steering angle for adjusting the steering angle of the steered wheels relative to the steering angle of the steering wheel for the behavior control) as a first target control amount, and outputs a signal indicating the target steering angle δt to the electronic control device 34 for the steering angle control by way of the vehicle information infrastructure 62. Moreover, the electronic control device 52 for the behavior control calculates target braking pressures Pti for the respective wheels based upon the target deceleration Gxbt and the target yaw moment, Mtb, and controls the oil pressure circuit 44 so that the braking pressures Pi of the respective wheels become the target braking pressures Pti.

The electronic control device 34 for the steering angle control calculates an estimated target steering angle δth of the front left and right wheels for stabilizing the behavior of the vehicle in substantially the same manner as by the electronic control device 52 for the behavior control or in a more convenient way as a second target control amount. When the electronic control device 34 for the steering angle control, the electronic control device 52 for the behavior control and the communication means therebetween are normal, the estimated target steering angle δth and the target steering angle δt should become substantially the same as each other.

The electronic control devices 34 for the steering angle control assumed as the second calculation control device compares the target steering angle δt assumed as the first target control amount input from the electronic control device 52 for the behavior control assumed as the first calculation control device and the estimated target steering angle δth assumed as the second target control amount generated by itself, and when the difference is less than a determined value β set as an abnormality judging standard, judges that the target steering angle δt is correct, and controls the steering angle adjusting device 24 based upon the target steering angle δt so that the front left and right wheels are steered for the target steering angle δt, whereas when the difference between the target steering angle δt and the estimated target steering angle δth is not less than the abnormality judging standard β, the steering of the front left and right wheels by the steering angle control is stopped.

In this connection, in terminating the steering control of the front left and right wheels in the way, the electronic control device 34 for the steering angle control gradually decreases the target steering angle δt while continuing the control operation of the steering angle adjusting device 24, and when the target control amount δt has become 0, stops the control operation of the steering angle adjusting device 24.

Alternatively, the electronic control device 34 for the steering angle control may output the result of the normality/abnormality judgment of the target steering angle δt to the electronic control device 52 for the behavior control by way of the vehicle information infrastructure 62, and the electronic control device 52 for the behavior control may gradually decrease the sharing ratio of the target yaw moment Mts by the steering angle control for the target yaw moment Mt when the result of the judgment of the target steering angle δt is abnormal so that all of the target yaw moment Mt is finally shared for the control of the braking pressures Pi of the respective wheels. Further details in this regard will be described later.

The electronic control device 40 for the EPS control compares the first target control amount δt input from the electronic control device 52 for the behavior control assumed as the first calculation control device by way of the vehicle information infrastructure 62 and the second control amount δth input from the electronic control device 34 for the steering angle control assumed as the second calculation control device, and judges if there is an abnormality in any of δt, δth and the communication of the vehicle information infrastructure 62, or may compare the target control amount δt input from the electronic control device 52 for the behavior control assumed as the first calculation control device by way of the vehicle information infrastructure 62 and the target control amount input δt from the electronic control device 52 for the behavior control assumed as the first calculation control device by way of the vehicle information infrastructure 62 as well as the electronic control device 34 assumed as the second calculation control device, so as to operate as a third calculation control device to judge an abnormality in the communication of signals through the vehicle information infrastructure 62.

The abovementioned transmissions of the control amounts and the results of the judgments are shown in FIG. 2 by the solid lines, broken lines and a chain line with arrows as an embodiment.

In this regard, it is to be noted that the abovementioned control of the steering angle of the steered wheels and the behavior control by the control of the braking forces themselves do not form the gist of the present invention, and may be executed in any manner known in this art.

Figure 3:
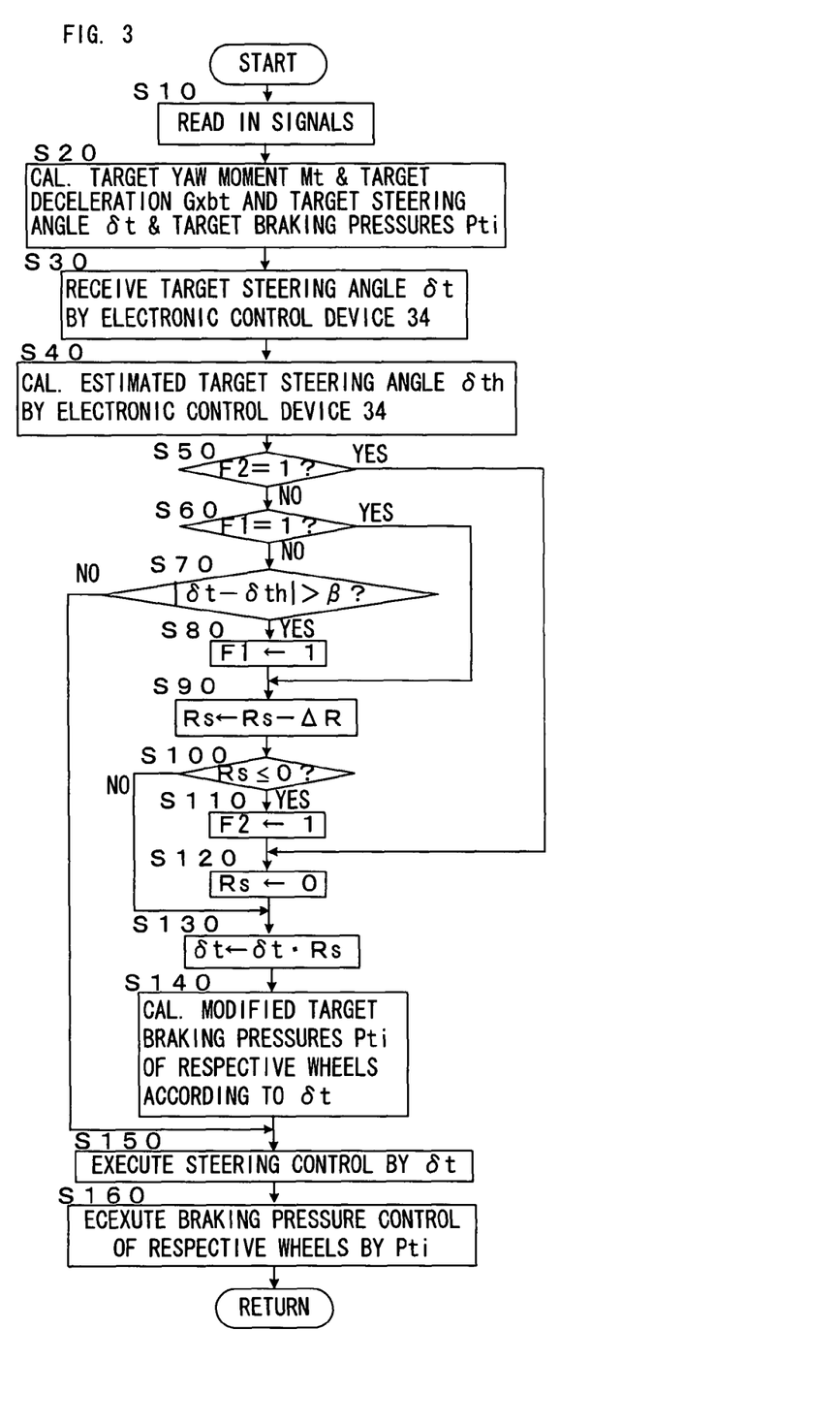
FIG. 3 is a flowchart showing the operation of the control device according to the present invention.

Next, the control of the vehicle executed by the embodiment shown in FIGS. 1 and 2 is described with respect to a turn behavior control based upon the steering angle control and the braking control by referring to the flowchart shown in FIG. 3. The control according to the flowchart shown in FIG.

3 may be started at the closing of an ignition switch not shown in the figure and executed repetitively at a cycle time of 10-100 milliseconds.

When the control is started, in step 10 the signals indicating the steering angle θ and others are read in, and then in step 20 a spin state amount SS showing the tendency of the vehicle to spin and a driftout state amount DS showing the tendency of the vehicle to driftout are calculated in a manner known in this art, and based thereupon the target yaw moment Mt and the target deceleration Gxbt of the vehicle for stabilizing the turning behavior of the vehicle are calculated in a manner known in this art, and then base thereupon the target steering angle δt and the target braking pressures Pti of the respective wheels are calculated, all by the calculation control device 52 for the behavior control.

The target steering angle δt thus calculated is sent out to the vehicle information infrastructure 62 and is received by the electronic control device 34 for the steering angle control.

On the other hand, in step 40 the estimated target steering angle δth is calculated by the electronic control device 34 for the steering angle control based upon the signals showing steering angle and others read in in step 10.

Then the control proceeds to step 50 and it is judged if a flag F2 is 1 or not. Since the flag F2 is reset to 0 at the starting of the control, and set to 1 when the control comes to step 110, it is 0 in the meantime, and therefore, the answer is no, and the control proceeds to step 60.

In step 60 it is judged if a flag F1 is 1 or not. Since the flag F1 is set to 1 when the control comes to step 80 described hereinbelow, it is 0 in the meantime, and therefore, the control proceeds to step 70.

In steps 70 it is judged if the absolute value of the difference between the target steering angle St calculated by the electronic control device 52 in step 20 and the target steering angle δth calculated by the electronic control device 34 in step 40 is larger than a determined limit value β. The reason why the judgment is made with respect to the absolute value of the difference between δt and δth is in that there are the leftward steering and the rightward steering with respect to the steering angle with the one of them being expressed as a positive value and the other being expressed as a negative value. The comparison between δt and δth may be made by the electronic control device 34 for the steering angle control or the electronic control device 40 for the EPS control as described above.

The value of β may be set to become smaller in a higher vehicle speed range than in a lower vehicle speed range. This is to take a larger influence of an abnormality happening in the communication or generation of the target steering angle δt at a higher vehicle speed into consideration.

Although herein it is assumed that the estimated target steering angle δth is calculated by the electronic control device 34 in step 40 to be compared with δt, when the electronic control device 40 for the EPS control is operated as the third calculation control device, the comparison is made by the electronic control device 40 for the EPS control so as to compare δt sent from the electronic control device 52 for the behavior control to the electronic control device 40 for the EPS control by way of the vehicle information infrastructure 62 and δt sent from the electronic control device 52 for the behavior control to the electronic control device 40 for the EPS control by way of the vehicle information infrastructure 62 and the electronic control device 34 for the steering angle control, and to judge if there is an abnormality in the vehicle information infrastructure 62 for transmitting the signals from the electronic control device 52 for the behavior control to the electronic control device 34 for the steering angle control as described above, such a judging also being made in step 70 according to if there is a difference beyond β between the two δt transmitted through those different communication routes.

In either case, when there is no difference beyond β in the comparison and the answer of step 70 is no, the control proceeds to step 150, wherein the steering control by the target steering angle δt is executed, and then in step 160 the braking control of the respective wheels by the target braking pressures Pti is executed.

In contrast, when the answer of step 70 is yes, the control proceeds to step 80, wherein the flag F1 is set to 1, and then the control proceeds to step 90.

In step 90, the sharing ratio Rs for sharing the target yaw moment Mt and the target deceleration Gxbt into the target steering angle δt and the target braking pressures Pti of the respective wheels in step 20 is decreased as much as ΔR in each cycle of passing through this flowchart. Then in step 100 it is judged if Rs has lowered to 0 or therebelow. While the answer is no, the control proceeds to step 130 by bypassing steps 110 and 120, wherein the effective value of δt is decreased by multiplying each value of Rs to the δt calculated in step 20. Then in step 140 the modified values of the target braking pressures Pti of the respective wheels modified to compensate for the decrease of the effective δt are calculated, then in step 150 the steering control is executed by the decreased effective δt, and then in step 160 the braking control of the respective wheels is executed by the modified Pti.

When the answer of step 70 becomes once yes, the flag F1 is set to 1 in step 80, and thereafter the answer of step 60 becomes yes, and therefore the control proceeds from step 60 to step 90 by bypassing steps 70 and 80.

When the gradual decrease of Rs progresses, soon the answer of step 100 changes from no to yes. Then the control proceeds to step 110, and the flag F2 is set to 1, and then in the following step 120 Rs is made 0. When the operation of the vehicle is continued thereafter, the control proceeds from step 50 to step 120 by bypassing steps 60-110 with Rs being kept at 0 so that no substantial steering control is executed, while the braking control only is executed. In this connection, although not shown in the figure, an appropriate warning signal may be output for the driver when the answer of step 70 becomes yes.

Figure 4:
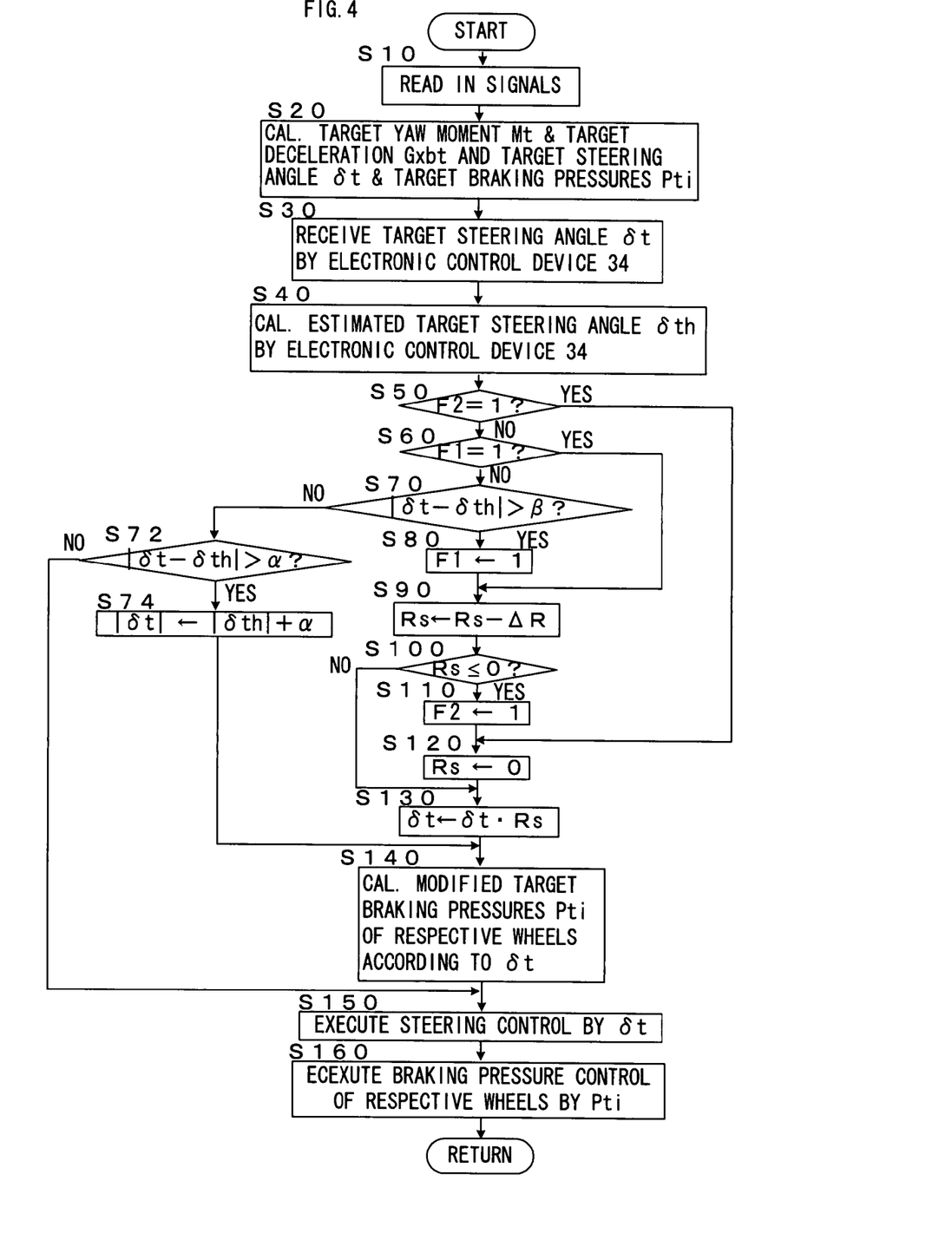
FIG. 4 is a flowchart modifying a part of the flowchart of FIG. 3.
Figure 5:
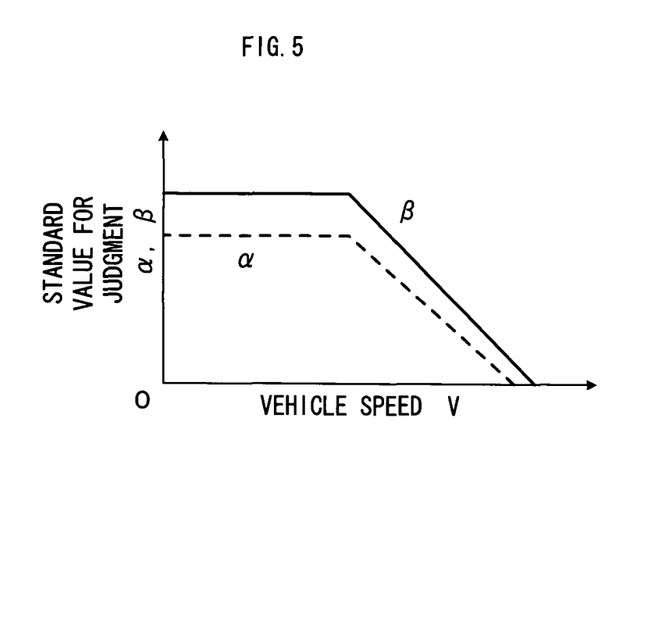
FIG. 5 is a map showing the judging standard values α and β against vehicle speed V.
Figure 6:
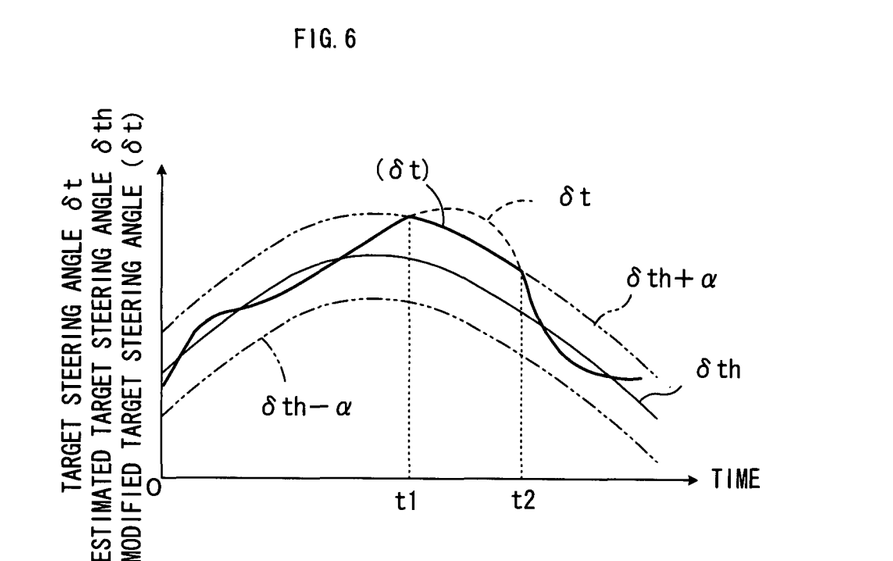
FIG. 6 is a map showing an example of restricting the target steering angle δt by the estimated target steering angle δth.

FIG. 4 is a flowchart which is different from the flowchart of FIG. 3 only in further including steps 72 and 74. In this case, even when there is no difference between δt and δth, or the two δt according to the abovementioned different communication routes, which exceeds β, such that the answer of step 70 is no, in step 72 it is judged if there is a difference larger than a limit value α smaller than β as shown in FIG. 5. The limit value α may also be made smaller when the vehicle speed is high than when the vehicle speed is low. Then, when the answer is no, the control proceeds to step 150, whereas, when the answer is yes, the control proceeds to step 74, wherein the target steering angle δt (absolute value thereof) is modified to the modified target steering angle (δt) while being kept to be different from the estimated target steering angle δth within the difference α. The manner of such modification is shown in FIG. 6, provided that herein it is assumed that the target steering angle δt, the estimated target steering angle δth, and the modified target steering angle (δt) are all positive, i.e. the vehicle is turning leftward.

Thus, it will be appreciated that, according to the present invention, in the vehicle control device in which the first and second calculation control devices are connected with each other by the communication means, the first calculation control device calculates a target control amount for the vehicle operation control according to the vehicle state amounts, and the second calculation control device executes the operation control of the vehicle based upon the target control amount input from the first calculation control device by way of the communication means, the second calculation control device separately calculates the target control amount by itself and compares the target control amount input from the first calculation control device by way of the communication means and the target control amount calculated by itself, or a third calculation control device compares these two target control amounts, or the third calculation control device compares the target control amount input from the first calculation control device by way of the communication means and the target control amount input from the second calculation control device by way of the communication means, and when an abnormality is judged by the comparison, the manner of operation control of the vehicle is modified so that a rapid counter-measure is made against the abnormality in the communication means for transmitting the target control amount from the first calculation control device to the second calculation control device.

Although the present intention has been described in detail with respect to an embodiment thereof and a modification of a part thereof, it will be apparent for those skilled in the art that various modifications are possible within the scope of the present invention.

The invention claimed is:

1. A control device for vehicles comprising:
   first and second calculation control devices and a communication means connecting therebetween, the first calculation control device calculating a target control amount for operating the second calculation control device to execute a vehicle operation control according to a vehicle state amount, the second calculation control device executing the operation control of the vehicle based upon the target control amount input from the first calculation control device by way of the communication means; and
   a third calculation control device connected with the first and second calculation control devices by way of the communications means, wherein the third calculation control device compares the target control amount input from the first calculation control device by way of the communication means and the target control amount input from the second calculation control device, and the abnormality judgment is made by the third calculation control device based upon the comparison, wherein
   the second calculation control device calculates an amount for comparison for the target control amount for the vehicle operation control in addition to executing the operation control of the vehicle in a more convenient way compared to the calculation in the first calculation control device,
   the target control amount calculated by the first calculation control device and the amount for comparison for the target control amount calculated by the second calculation control device are compared with one another in the second calculation control device,
   the vehicle operation control is executed by the second calculation control device according to the target control amount calculated by the first calculation control device and transmitted thereto by way of the communication means as long as no abnormality is judged based upon the comparison but modified in a manner thereof according to an abnormality judgment based upon the comparison, and the target control amount is an adjusting amount of steering angle of steered wheels relative to a steering angle of a steering wheel, and the third calculation control device is an electronic control device for an electric power steering device.

2. A control device for vehicles according to claim 1, wherein the modification of the vehicle operation control in the manner thereof according to the abnormality judgment is such that the second calculation control device executes the vehicle operation control based upon a modified target control amount obtained by decreasing the original target control amount.

3. A control device for vehicles according to claim 2, wherein the target control amount is an adjusting amount of steering angle of steered wheels relative to a steering angle of a steering wheel, and the modified target control amount is gradually decreased according to the lapse of time.

4. A control device for vehicles according to claim 1, wherein the target control amount is an adjusting amount of steering angle of steered wheels relative to a steering angle of a steering wheel.

5. A control device for vehicles according to claim 1, wherein a standard for the abnormality judgment based upon the comparison is made more strict when vehicle speed is high than when vehicle speed is low.

6. A control device for vehicles according to claim 1, wherein the abnormality judgment based upon the comparison of the two target control amounts is made in two stages such that, when a larger degree of abnormality was judged, the control is ended by gradually decreasing the target control amount calculated by the first calculation control device, whereas, when a smaller degree of abnormality was judged, the control is continued based upon a modified target control amount to restrict the target control amount calculated by the first calculation control device not to be different from the target control amount calculated by the second calculation control device beyond a determined difference.

7. A control device for vehicles comprising:
   first, second and third calculation control devices and a communication means connecting thereamong, the first calculation control device calculating a target control amount for operating the second calculation control device to execute a vehicle operation control according to a vehicle state amount, the second calculation control device executing the operation control of the vehicle based upon the target control amount input from the first calculation control device by way of the communication means, wherein
   the second calculation control device calculates an amount for comparison for the target control amount for the vehicle operation control in addition to executing the operation control of the vehicle in a more convenient way compared to the calculation in the first calculation control device;
   the third calculation control device compares the target control amount input from the first calculation control device by way of the communication means and the target control amount input from the first calculation control device to the second calculation control device by way of the communication means and then input from the second calculation control device to the third calculation control device by way of the communication means;
   the vehicle operation control is executed by the second calculation control device according to the target control amount calculated by the first calculation control device and transmitted thereto by way of the communication means as long as no abnormality is judge based upon the comparison but modified in a manner thereof according to an abnormality judgment based upon the comparison; and the target control amount is an adjusting amount of steering angle of steered wheels relative to a steering angle of a steering wheel, and the third calculation control device is an electronic control device for an electric power steering device.

8. A control device for vehicles according to claim 7, wherein the modification of the vehicle operation control in the manner thereof according to the abnormality judgment is such that the second calculation control device executes the vehicle operation control based upon a modified target control amount obtained by decreasing the original target control amount.

9. A control device for vehicles according to claim 8, wherein the target control amount is an adjusting amount of steering angle of steered wheels relative to a steering angle of a steering wheel, and the modified target control amount is gradually decreased according to the lapse of time.

10. A control device for vehicles according to claim 7, wherein the target control amount is an adjusting amount of steering angle of steered wheels relative to a steering angle of a steering wheel.

* * * * *